United States Patent [19]
Demaline

[11] Patent Number: 5,968,393
[45] Date of Patent: Oct. 19, 1999

[54] HOT WATER CONTROLLER

[76] Inventor: John Tracey Demaline, R.R. #3, Georgetown, Ontario, Canada, L7G 4S6

[21] Appl. No.: 08/526,962

[22] Filed: Sep. 12, 1995

[51] Int. Cl.⁶ ................................................ H05B 1/02
[52] U.S. Cl. ........................ 219/492; 219/485; 219/486; 219/506; 219/487; 392/454; 236/20 R; 236/46 R
[58] Field of Search ................................ 219/490, 492, 219/494, 497, 501, 508, 506, 483, 486, 485; 236/20 R, 46 R; 307/117; 392/454

[56] References Cited

U.S. PATENT DOCUMENTS

| | | | |
|---|---|---|---|
| 2,238,624 | 4/1941 | Clark | 219/39 |
| 3,329,800 | 7/1967 | Lee | 219/321 |
| 3,597,589 | 8/1971 | Morgan | 219/321 |
| 3,946,243 | 3/1976 | Anderson et al. | 307/140 |
| 3,989,928 | 11/1976 | Scragg et al. | 219/334 |
| 4,016,402 | 4/1977 | Scott | 219/334 |
| 4,170,729 | 10/1979 | Lane et al. | 219/364 |
| 4,305,005 | 12/1981 | McKenney et al. | 307/31 |
| 4,315,248 | 2/1982 | Ward | 340/825.72 |
| 4,370,723 | 1/1983 | Huffman et al. | 364/483 |
| 4,449,178 | 5/1984 | Blau et al. | 364/148 |
| 4,461,949 | 7/1984 | Weiser | 219/334 |
| 4,467,178 | 8/1984 | Swindle | 219/330 |
| 4,508,261 | 4/1985 | Blank | 236/20 R |
| 4,511,790 | 4/1985 | Kozak | 219/486 |
| 4,568,821 | 2/1986 | Boe . | |
| 4,583,090 | 4/1986 | Eden et al. | 340/825.07 |
| 4,638,147 | 1/1987 | Dytch et al. | 219/308 |
| 4,645,908 | 2/1987 | Jones | 219/378 |
| 4,702,305 | 10/1987 | Beckey et al. | 165/12 |
| 4,702,413 | 10/1987 | Beckey et al. | 236/46 R |
| 4,737,615 | 4/1988 | Stipe | 219/330 |
| 4,749,992 | 6/1988 | Fitzemeyer et al. | 340/870.02 |

(List continued on next page.)

FOREIGN PATENT DOCUMENTS

| | | |
|---|---|---|
| 1098996 | 4/1981 | Canada . |
| 1133097 | 10/1982 | Canada . |
| 1147001 | 5/1983 | Canada . |
| 1202351 | 3/1986 | Canada . |
| 1210425 | 8/1986 | Canada . |
| 1214842 | 12/1986 | Canada . |
| 1219891 | 3/1987 | Canada . |
| 1234860 | 4/1988 | Canada . |
| 2039752 | 10/1991 | Canada . |
| 2045202 | 12/1991 | Canada . |
| 2121129 | 7/1993 | Canada . |
| 2147974 | 5/1994 | Canada . |
| 2126925 | 1/1995 | Canada . |
| 2130039 | 3/1995 | Canada . |
| 2118049 | 4/1995 | Canada . |
| 2048525 | 12/1980 | United Kingdom . |
| 2203861 | 10/1988 | United Kingdom . |
| 9222417 | 10/1992 | United Kingdom . |
| 90/12261 | 10/1990 | WIPO . |
| 82/04370 | 12/1992 | WIPO . |

OTHER PUBLICATIONS

Honeywell, D1000 Duty Cycling, 1978.
Honeywell, Duty Cycling Fundamentals, 1981.
Honeywell, D5600 Duty Cycling Operator's Manual, 1981.
Honeywell, D1000 Duty Cycling Application Guide, 1980.

*Primary Examiner*—Mark H. Paschall

[57] ABSTRACT

This is a system for controlling the heating of water in the tank, water in tank adapted to be heated by a first heater and a second heater, the system comprises a timer adapted to keep time, and a sensor to monitor the temperature of the water in the tank at a first position and the temperature of the water in the tank at a second position. The system is adapted to set a first set point temperature at a specified time and the first set point temperature is varied by the system over time. The system is also being adapted to set a second set point temperature the second set point temperature also being varied by the system over time. The system has an activator to activate the first heater to maintain the temperature of water in the tank at the first position at about the first set point temperature at a specified time. The system has an activator to activate the second heater to maintain the temperature of water in the tank at the second position at about the second set temperature at a specified time.

23 Claims, 15 Drawing Sheets

U.S. PATENT DOCUMENTS

| | | | |
|---|---|---|---|
| 4,832,259 | 5/1989 | Vandermeyden | 236/20 R |
| 4,834,284 | 5/1989 | Vandermeyden | 236/20 R |
| 4,897,798 | 1/1990 | Cler | 364/505 |
| 4,935,601 | 6/1990 | Eaton-Williams | 219/295 |
| 4,935,603 | 6/1990 | Iwamoto et al. | 219/330 |
| 4,948,948 | 8/1990 | Lesage | 219/329 |
| 4,959,526 | 9/1990 | Kurachi et al. | 219/314 |
| 4,998,024 | 3/1991 | Kirk et al. | 307/40 |
| 5,023,432 | 6/1991 | Boykin et al. | 219/497 |
| 5,095,715 | 3/1992 | Dudley | 62/228.4 |
| 5,103,078 | 4/1992 | Boykin et al. | 219/494 |
| 5,219,119 | 6/1993 | Kasper et al. | 236/46 R |
| 5,220,807 | 6/1993 | Bourne et al. | 62/238.6 |
| 5,270,952 | 12/1993 | Adams et al. | 364/505 |
| 5,274,571 | 12/1993 | Hesse et al. | 364/492 |
| 5,289,362 | 2/1994 | Liebl et al. | 364/140 |
| 5,317,670 | 5/1994 | Elia | 392/464 |
| 5,361,729 | 11/1994 | Trihey | 122/17 |

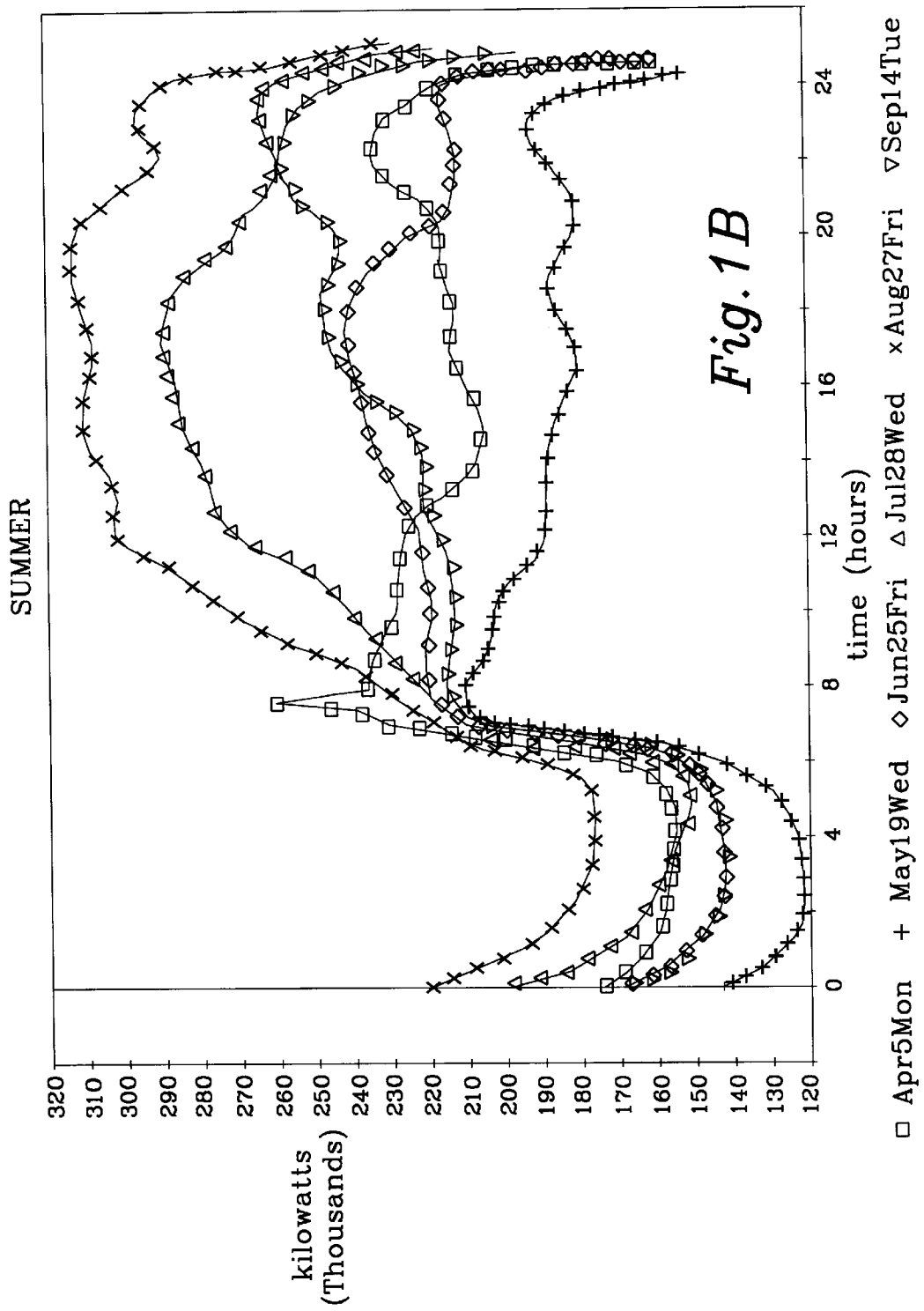

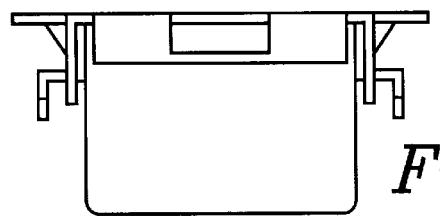
Fig.10c
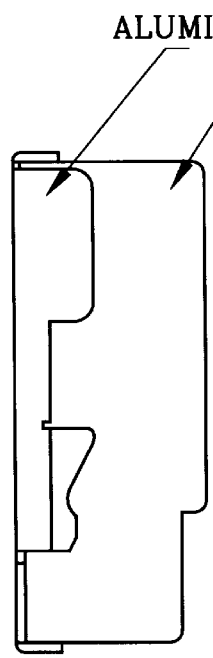
ALUMINIUM PLATE
PLASTIC PART
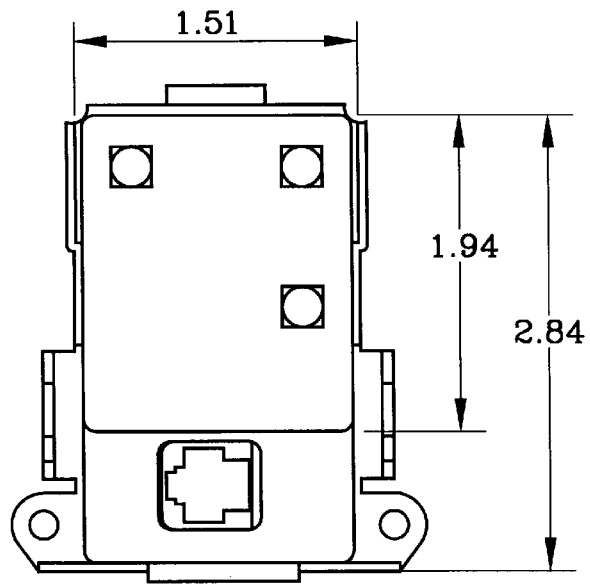
Fig.10b   Fig.10a
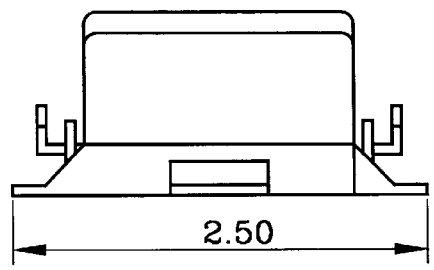
Fig.10d

*Fig.11c*
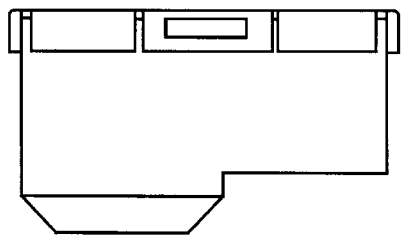
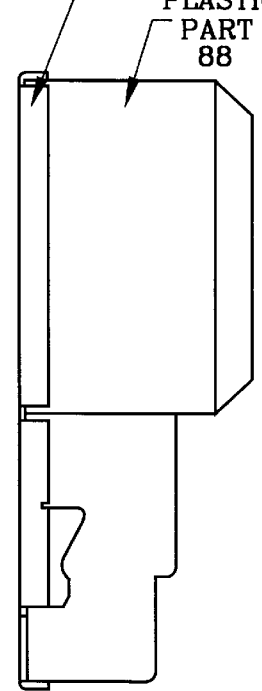
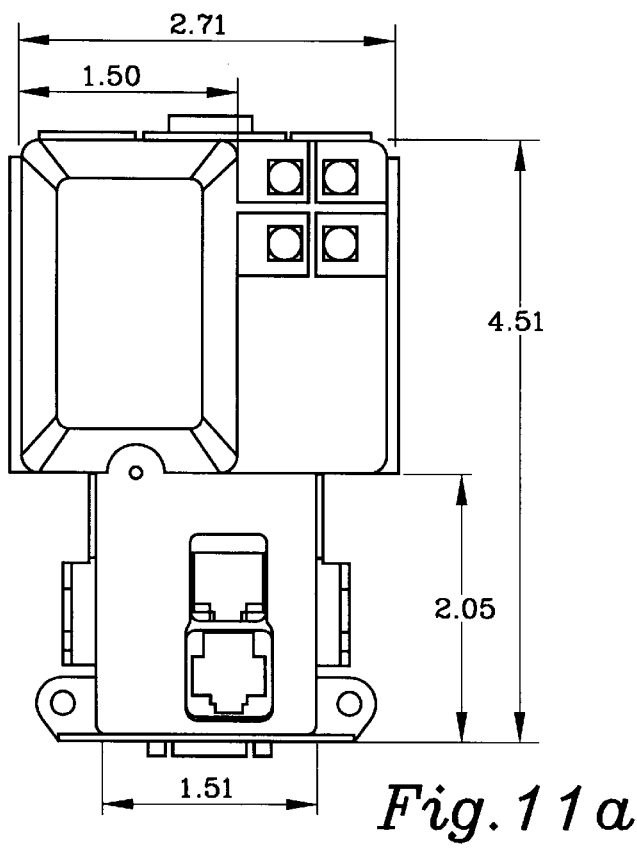
*Fig.11b*          *Fig.11a*
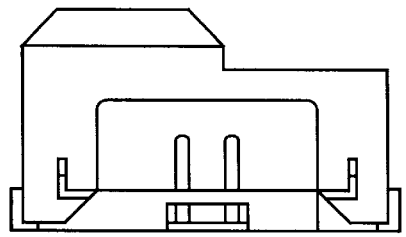
*Fig.11d* ered stations whose output is difficult to vary. During the peak periods, additional electric energy may be generated by generating stations whose power output may be varied. Accordingly, the cost of producing excess energy during the peak period may be significant. Similarly, during the off-peak periods demand for electricity may fall below the minimum generated output power. Because of the nature of the generating stations used to generate this minimum power, it may difficult if not impossible to reduce the minimum power produced. Therefore, energy providers are desirous of shifting some of the load demanded by their consumers from the peak periods to off-peak periods.

HOT WATER CONTROLLER

BACKGROUND OF THE INVENTION

Conventional electric domestic hot water heaters typically comprise a tank for water storage and at least one electrical element for heating water stored in the tank. Typically, an electric hot water heater is equipped with two ohmic electrical elements for heating: one near the top of the tank, and one near the bottom of the tank.

Upper and lower thermostats are further typically located in proximity to each element. These thermostats maintain the temperature of the water in the top and bottom regions at a single pre-selected set-point. Often thermostats incorporating bi-metallic switches are used to maintain the tank temperature.

This method of heating water in a hot water tank has numerous disadvantages. From a user's point of view, this type of heater wastes energy. As the temperature of the tank is maintained near a single set-point throughout the day, energy given off by the heater to the environment is constantly replenished. Similarly, the tank may be heated at all hours of title day, even though the end user may not require a full tank of water at all hours of the day.

From an energy provider's point of view, conventional hot water heaters require power at all hours of the day. Accordingly, even though a user has no need for hot water and electric power may be at a premium to the energy provider because of peak energy demands across the entire electric power grid, the elements of a hot water heater may be consuming electrical energy.

From a consumer's perspective, a control system for the heating of an electrical hot water tank which reduces the net energy provided to the tank as compared to the energy provided by a conventional hot water heater is desirable.

From an energy provider's perspective, a control system which allows the majority of the heating of a hot water tank to be heated during times when energy is not in high demand is desirable.

Moreover, if such a system when implemented in multiple households can be used to increase power demand during off peak-energy consumption times (the "off-peak periods") and decrease power demand during peak energy consumption times (the "peak periods"), further benefits may be achieved. These benefits are realized because an electric energy provider is typically equipped to provide a certain minimum load at all times during the day. This minimum load is generated by electric generating stations whose output is difficult to vary. During the peak periods, additional electric energy may be generated by generating stations whose power output may be varied. Accordingly, the cost of producing excess energy during the peak period may be significant. Similarly, during the off-peak periods demand for electricity may fall below the minimum generated output power. Because of the nature of the generating stations used to generate this minimum power, it may difficult if not impossible to reduce the minimum power produced. Therefore, energy providers are desirous of shifting some of the load demanded by their consumers from the peak periods to off-peak periods.

It is known that the use of time shifting the heating of hot water in domestic electric hot water tanks may be used to "shift" energy demand requirements for an electric energy provider.

For example, U.S. Pat. No. 4,998,024 issued Mar. 5, 1991, naming Kirk as an inventor discloses a domestic hot water heater controller which turns a hot water heater off during peak demand times and activates the hot water heater to maintain a single net point temperature during off-peak periods.

Recognizing that maintaining the temperature at this set-point during off-peak periods may be wasteful, U.S. Pat. No. 2,238,624 issued Apr. 15, 1941 and naming Clark as inventor, discloses a hot water heater controller which does not activate the hot water heater until a critical time during an off-peak period. The critical time is calculated based on the rate at which the water in the tank may be heated and is chosen so as to provide a full tank of hot water at the beginning of the peak period.

These systems, however, do not take into account the electric energy provider's desire to evenly distribute demand during off-peak periods. U.S. Pat. No. 4,449,178 issued May 15, 1984 and naming Blau as inventor discloses a system which varies the power consumed by elements of the hot water heater by varying the duty cycle of the power provided to the elements so that the time required to fully heat a full tank water extends throughout the entire off-peak period. Thus, each hot water heater will consume a fraction of the power consumed by a conventional hot water heater, while remaining energized for a greater portion of the off-peak period.

Similarly, PCT application No. PCT/CA93/00455 naming Munroe et al. as inventors, discloses a system which distributes power consumption of a hot water heater by providing heating at intermittent, random time intervals during the off-peak period.

The known systems, however, do not provide for a flexible programming of the tank temperature at various times of the day, week, month or year. Moreover, the known systems do not provide for the direct and independent control of upper and lower tank temperature during these time intervals. Additionally, the known systems are not adapted to be simply fitted to existing tanks. Instead they require the installation of additional and temperature and control circuitry.

SUMMARY OF THE INVENTION

This novel system of controlling the heating of a hot water tank includes utilizing a controller to independently maintain the temperature of the tank at various locations within the tank at various set-points at various times. A predetermined schedule may be employed by the control system to vary the temperature set-points over a prolonged period of time (for example on a daily, weekly or yearly basis).

The temperature of the tank is maintained by a controller which forms part of the control system. The controller strives to maintain the temperature measured at a control point at a certain set temperature (ie. the temperature set-point). The controller may maintain this temperature simply by activating a heating source once the measured control temperature falls below the set-point temperature. Alternatively, the controller may use a more sophisticated algorithm, such as for example a proportional, integral, derivative control loop algorithm for maintaining the measured temperature at the set-point.

With the ability to independently vary the temperature of the tank at various locations over time, typically proximate one or more heating devices, the control system provides great flexibility in controlling the heating of a tank of hot water.

For example, the control system may be utilized simply to simulate the functioning of a known setback type thermostat system wherein during a hydro utility's off-peak period the temperature setting at which the heating element(s) for a hot water tank are activated may be lowered from the temperature settings required at other times.

In a more sophisticated system, the control system may be utilized to shift the power consumption of the water heater from peak periods to off-peak periods and to spread the heater's consumption throughout the off-peak periods. This may be accomplished by varying the upper and lower temperature set points during the off-peak period.

Specifically, the temperature set-points for a particular tank are increased gradually. The amount of time required to raise a control temperature from one set-point to the next is preferably only a fraction of the time interval between increasing the set-points. Accordingly it may be possible to stagger the operation of numerous hot water heaters so that they are nor all using electric energy at identical times. It is, for example, possible to stagger the activation temperatures of groups of heaters and their elements over time, so that at any given time only a relatively small proportion of heaters on a grid will be activated.

Moreover, the rate at which the set-point temperatures at various points within the tank are increased can vary. Thus, the temperature of the entire tank may be increased to a uniform final temperature in a given time interval.

In a hydro company's grid system, having thousands of hot water tanks, a considerable amount of energy typically delivered during peak periods may thus be delivered during off-peak periods.

Additionally, the independent control of the upper and lower tank temperatures may be used to maintain a constant supply of warm water in at least a portion of the tank at all times. This feature may be used to maintain a reserve of warm water near the outlet (typically near the top) of the tank at all times.

The manner in which temperature settings are varied is limitless. For example, the temperature settings may be increased linearly each hour over a period of time from a starting temperature to a desired finishing temperature. A possible variation might increase the temperature non-linearly over time to for example, compensate for increases in the rate of energy loss that occurs as the temperature gradient between the interior and exterior hot water tank increases.

Moreover, incrementally increasing temperature settings over a prolonged period, further reduces the overall energy required to achieve a desired temperature at the start of a peak period. In part, this is because the temperature difference between the interior and exterior of the tank will increase gradually. The rate at which energy is given off to the environment by the tank will also increase gradually. Thus, less energy will need to be provided to the tank to maintain it at the highest set-point temperature. Additionally, as a side benefit, the frequency at which the heater will turn on and off will be reduced thus extending the life of the relays providing energy to the elements.

According to one aspect of the invention there is provided a system for controlling the heating of water in a tank, said water in said tank adapted to be heated by a heating means, said system comprising: a programmable controller means for generating a plurality of set point temperatures; a programmable electronic thermostat means having a temperature sensor, said thermostat means being in communication with said controller means and said heating means; said programmable electronic thermostat means adapted to receive a set point temperature from said controller means, and said thermostat means being adapted to monitor the water temperature in said tank through said temperature sensor and to activate said heating means as required to maintain the water temperature at about said set point temperature; said system having a means for keeping time and said programmable controller means and said programmable thermostat means being adapted to cooperate to vary the set point temperature provided to said programmable electronic thermostat means over a time interval.

According to another aspect of the invention there is provided a system for controlling the heating of water in a tank, said water in said tank adapted to be heated by a first heating means and a second heating means, said system comprising: a timer means adapted to keep time, and a sensor means to monitor the temperature of the water in a tank at a first position and the temperature of the water in the tank at a second position; said system being adapted to set a first set-point temperature at a specified time and said first set point temperature being varied by the system over time; said system also being adapted to set a second set point temperature said second set point temperature being varied by said system over time; wherein the system has an activation means to activate said first heating means to maintain said temperature of water in said tank at said first position at about said first set point temperature at a specified time, and said system has an activation means to activate said second heating means to maintain the temperature of water in said tank at said second position at about said second set temperature at a specified time.

BRIEF DESCRIPTION OF THE DRAWINGS

The following is a brief description of the drawings:

FIG. 1b is a chart showing demand for energy over time of day for a typical hydro-electrical utility during a summer season.

DETAILED DESCRIPTION OF THE PREFERRED EMBODIMENTS

Figure 1A:
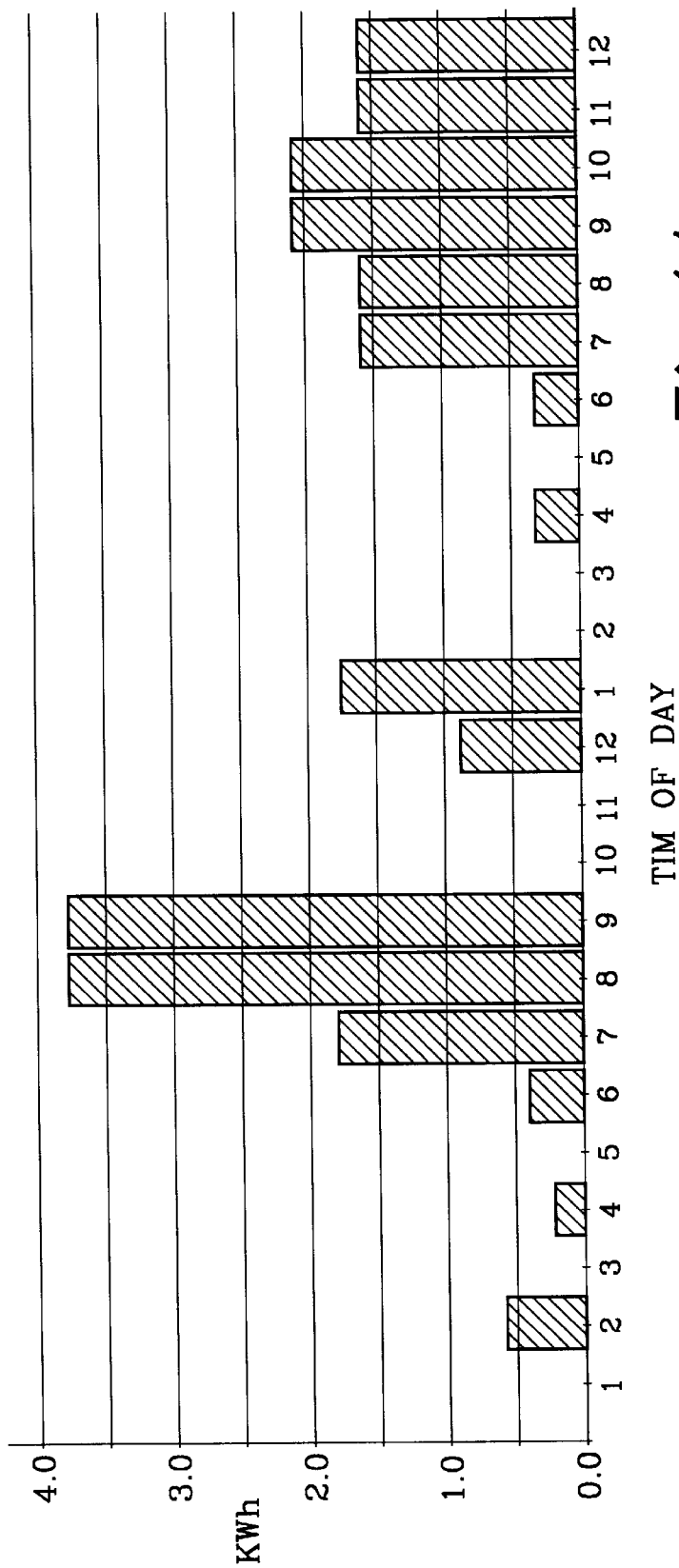
FIG. 1a is a chart showing energy consumption over time of day for a standard hot water tank employing a conventional bi-metallic thermostat.
Figure 1C:
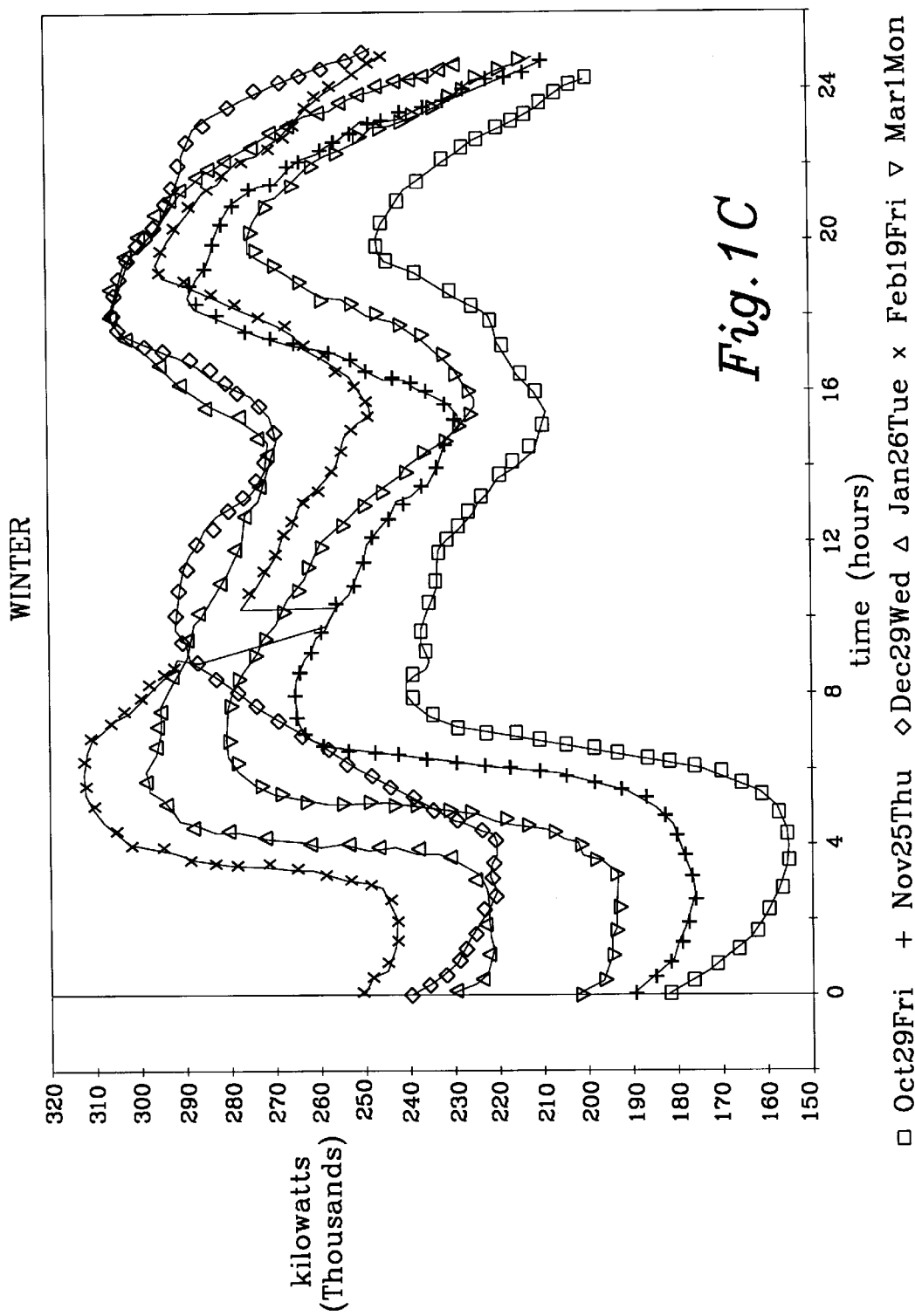
FIG. 1c is a chart showing demand for energy over time of day for a typical hydro-electrical utility during a winter season.

FIG. 1a illustrates a daily energy consumption profile that might be expected in a typical household by a hot water heater employing a standard, fixed setting thermostat. It will be noted that there is high energy consumption of the heater during between 7:00 a.m. and 9:00 a.m. and 7:00 p.m. and 12:00 a.m. These high energy demand periods of the hot water heater often coincide with the peak periods of the hydro company as a whole, as illustrated in FIG. 1b and 1c.

Figure 2:
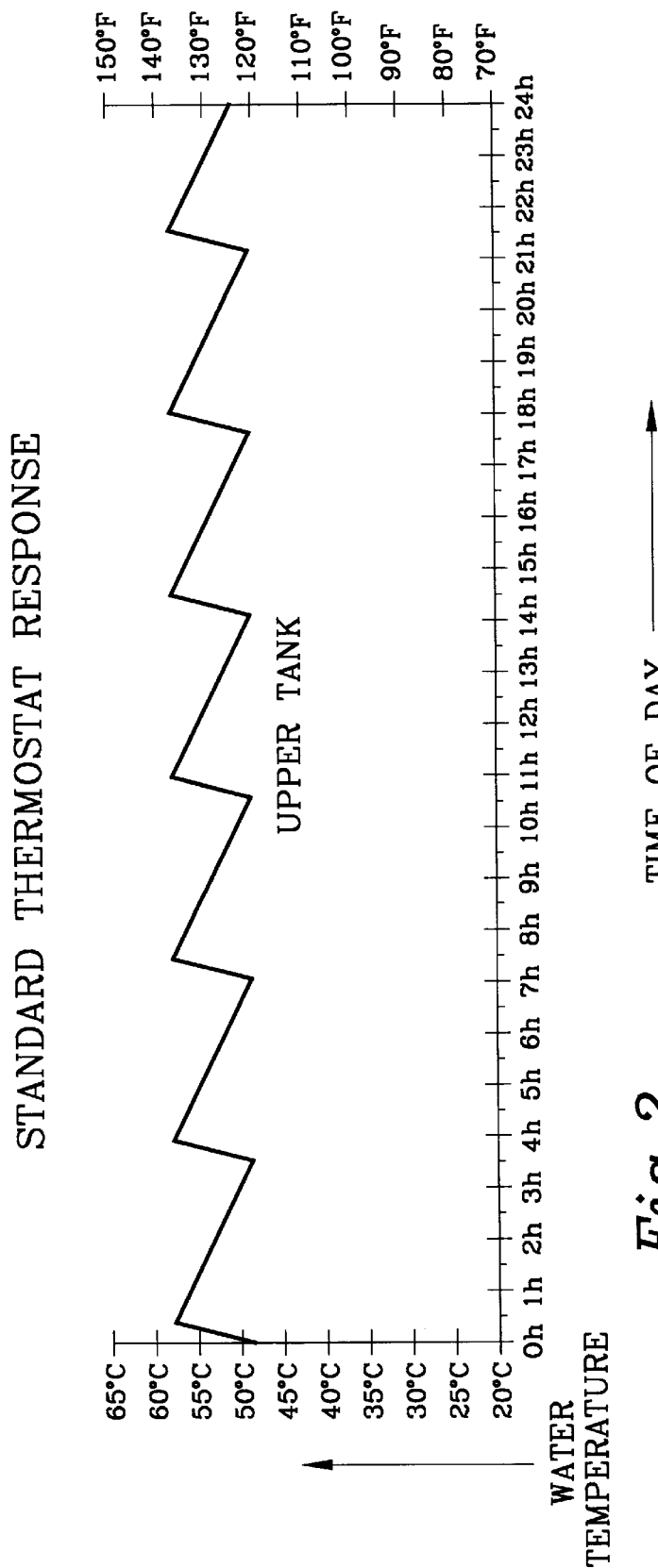
FIG. 2 is a chart showing the response of a bi-metallic thermostat positioned in an upper part of a standard hot water tank.

FIG. 2 illustrates the response of the tank temperature in the upper portion of a hot water tank that employs a standard, fixed temperature thermostat. It will be noted that the actual temperature in the tank varies quite widely when controlled by a standard bi-metallic fixed set thermostat, creating a "saw-tooth pattern".

Figure 3:
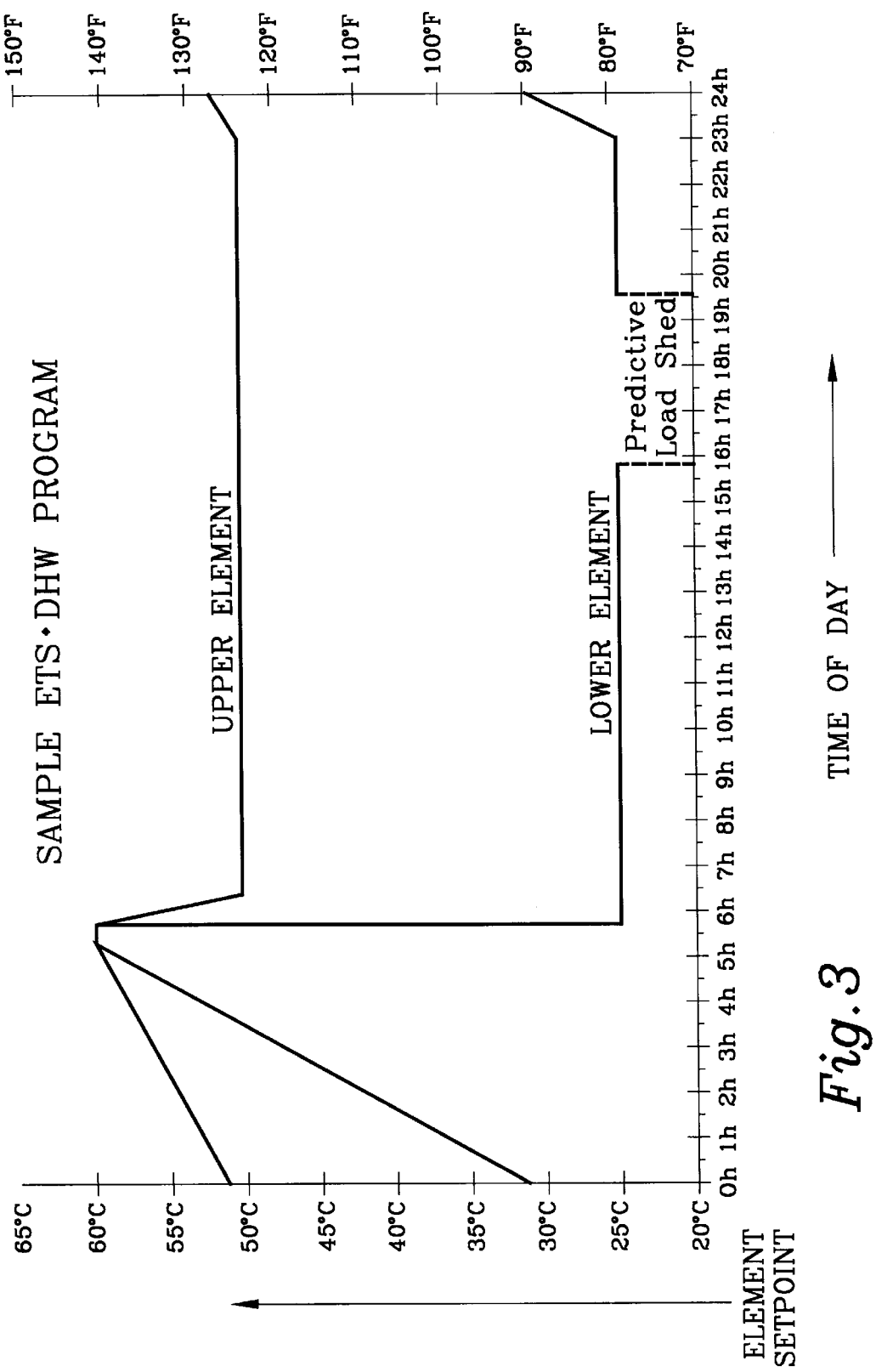
FIG. 3 is a chart showing the programmed set points for a controller constructed in accordance with one aspect of the invention.

With reference to FIG. 3 an example is shown of one control system's program cycle for temperature settings at various times during the cycle that might be employed in a hot water tank pursuant to this invention. The set-point temperatures over time are shown for a system that employs an upper heating element and a lower heating element in a hot water tank. The control system will independently vary the upper and lower tank set-point temperatures, in accordance with the illustrated schedule. First, the control system will maintain the temperature in the upper portion of the hot water tank. Thereafter, the control system will maintain the temperature of the lower portion of the tank. Upper and lower temperature settings are independent of each other. Temperature settings of each maybe varied relative to each other. During the off-peak period, which is typically 11:00 p.m. in the evening until 7:00 a.m. in the morning, the temperature of the upper portion of the tank is gradually increased from a temperature setting of 50° C. to a maximum temperature of 60° C. at 7:00 a.m. During the same time period, the set-point temperature for the lower portion of the tank linearly increased from approximated 32° C. to 60° C. (the maximum set-point temperature).

Thereafter, in the period 7:00 a.m. to 4:00 p.m., the set-point temperature for the upper portion of the tank is reduced to 50° C. and the lower tank temperature set-point reduced to approximately to 25° C. Thereafter between 4:00 p.m. and 8:00 p.m., the set-point temperature for the upper portion of the tank is maintained at 50° C., whereas the lower element is completely deactivated and will under no conditions in that period be turned on by the control system. This may be desirable in a grid in which an extremely high peak load is encountered, as shown in FIG. 3, between the hours of 4:00 p.m. and 8:00 p.m.

The controller will effect the increase in the settings in a manner determined by a control algorithm, as detailed below. Moreover, typically the variation will not be continuous but will be made at predetermined discrete intervals.

Figure 4:
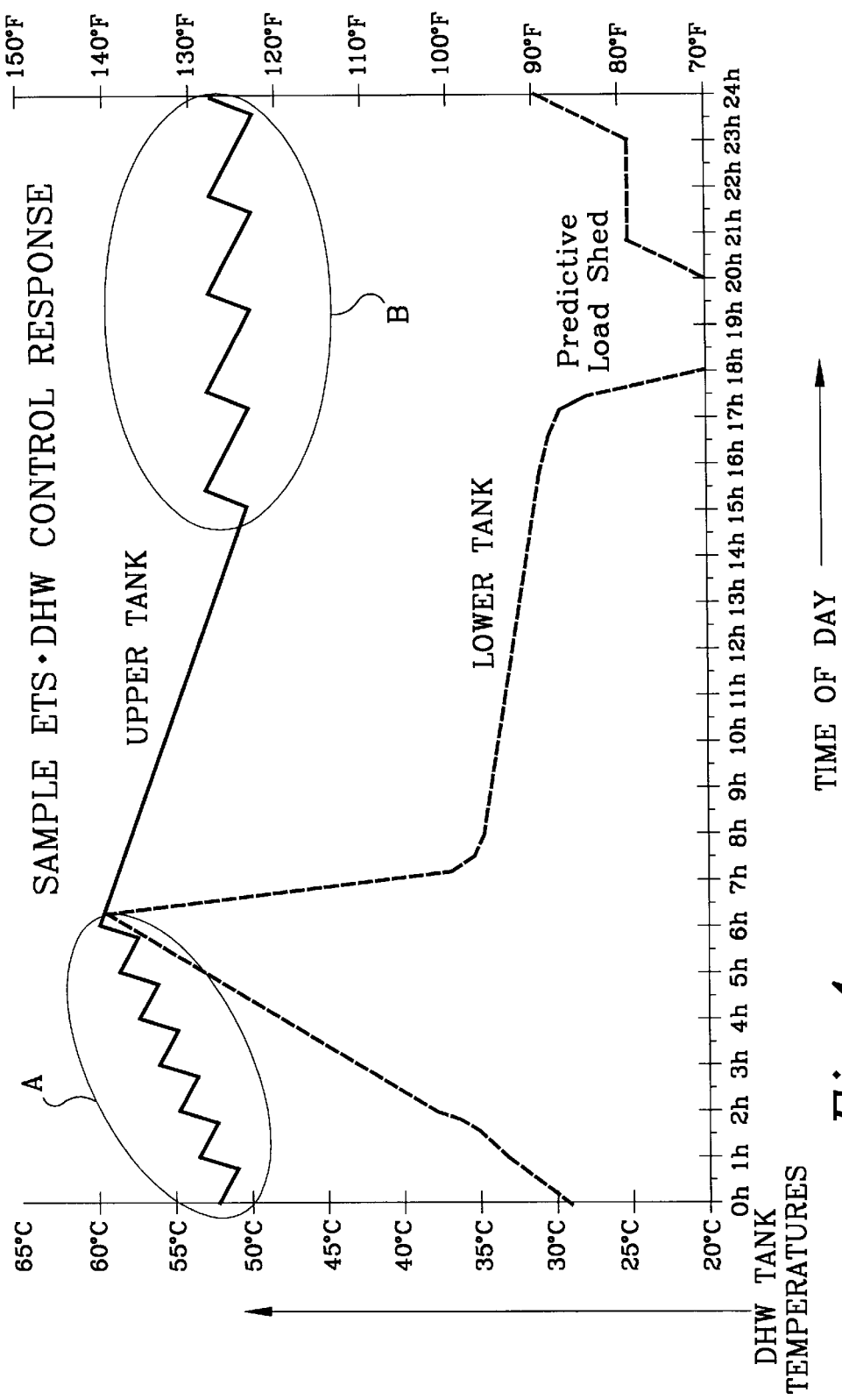
FIG. 4 is a chart showing the temperature response in the upper and lower parts of the tank when subjected to the controlled temperature set points of FIG. 3, and the standard water usage, that would normally produce the response shown in FIG. 2.

Turning now to FIG. 4, the temperature set points for both the upper and lower portions of the hot water tank are shown. Because the upper element is maintained during peak periods at 50° C., there will always be a reserve supply of hot water (perhaps 20% of capacity) to satisfy a reasonable demand for hot water from the hot water tank.

Immediately after 7:00 a.m. when high usage of the hot water tank is encountered, it will be noted that the temperature in the lower portion of the tank will have dropped quite dramatically. This is caused by the high usage of water at this time.

It will be noted that in FIG. 4, in the period between 3:00 p.m. and 12:00 midnight (marked as B) and in the period between approximately midnight and 7:00 a.m., the temperature response within the tank shows that there are fluctuations in the temperature in the upper portion, creating a sawtooth pattern, which is exaggerated. The ability of this system to control temperature settings will enable an improved degree of control to be achieved. Typically, in the absence of water usage, the controller will be able to achieve and maintain temperatures within the tank in both the upper and lower portions of the tank within a fairly narrow range. This range may be set by means of the algorithm described below.

Figure 5:
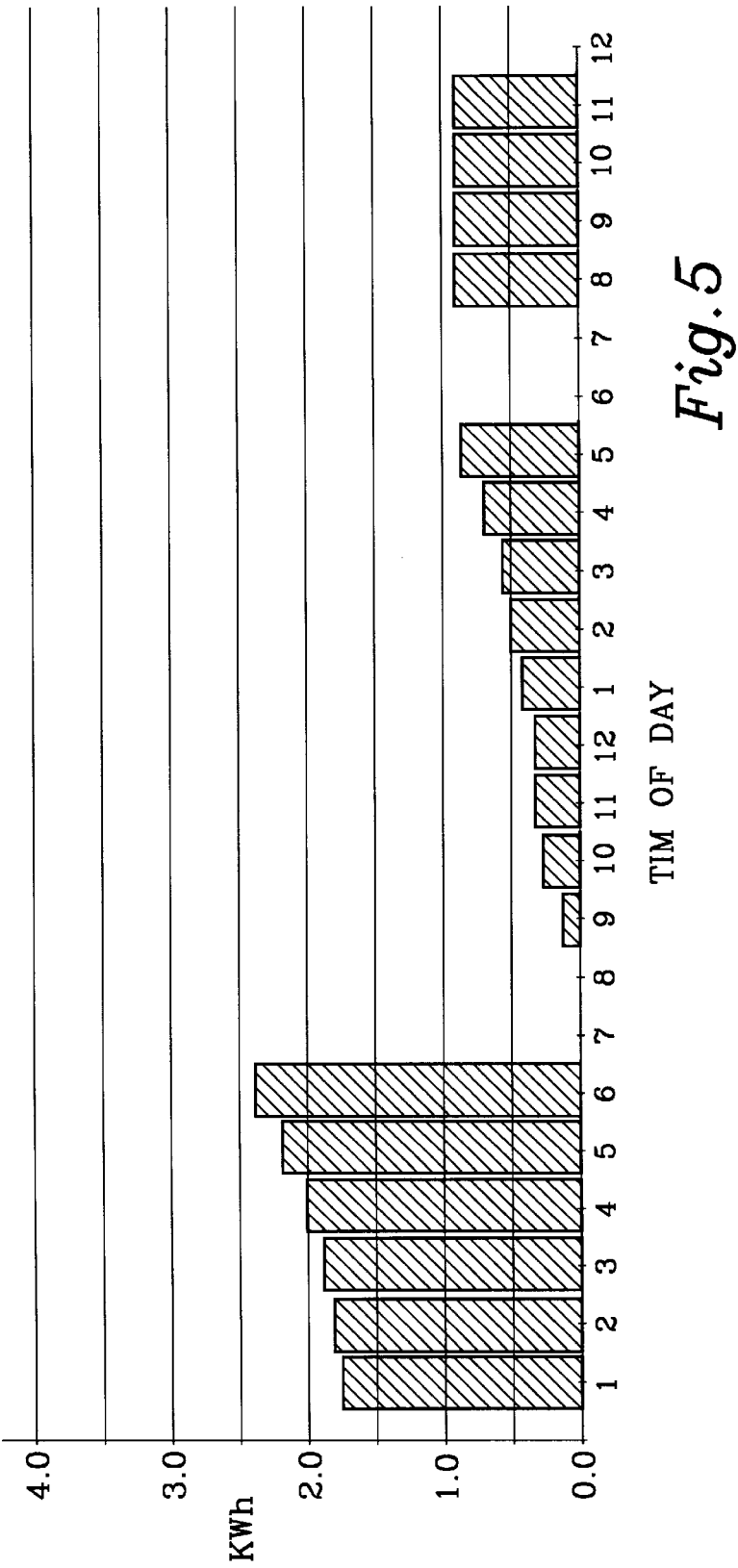
FIG. 5 is a chart showing the energy shift and shed achieved by the controller set in accordance with temperature settings illustrated in FIG. 3.

Comparing FIG. 5 with FIG. 1 it will be appreciated how by employing the controller as described hereinafter in more detail, to program temperature settings for the upper and lower elements as shown in FIG. 3, a load shift can be achieved to provide for a substantial amount of the energy required by the tank in heating water to be consumed in the off-peak between 11:00 p.m. and 7:00 a.m. in the morning.

Figure 6:
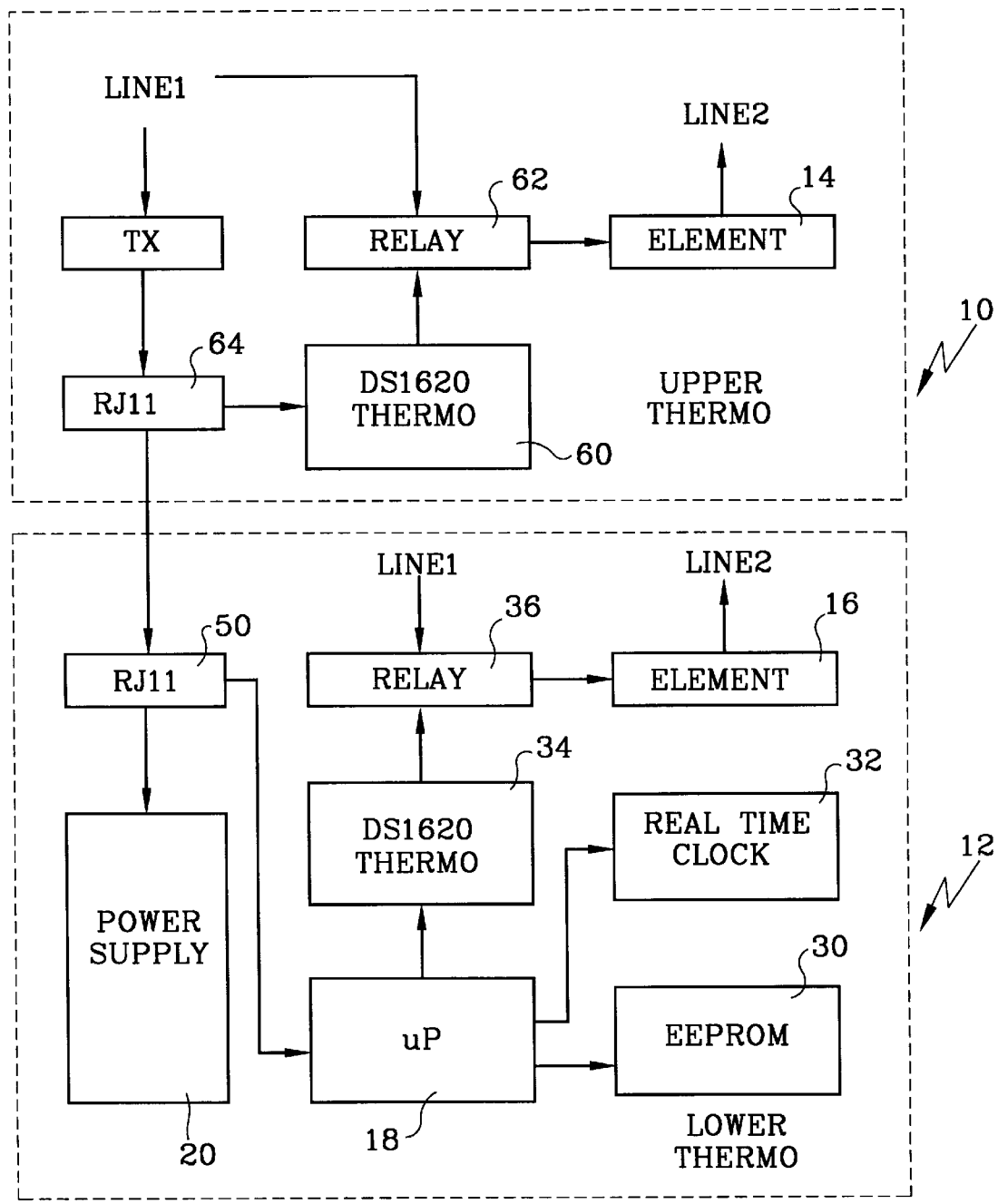
FIG. 6 in a schematic representation of a controller system constructed in accordance with one embodiment of this invention.
Figure 7:
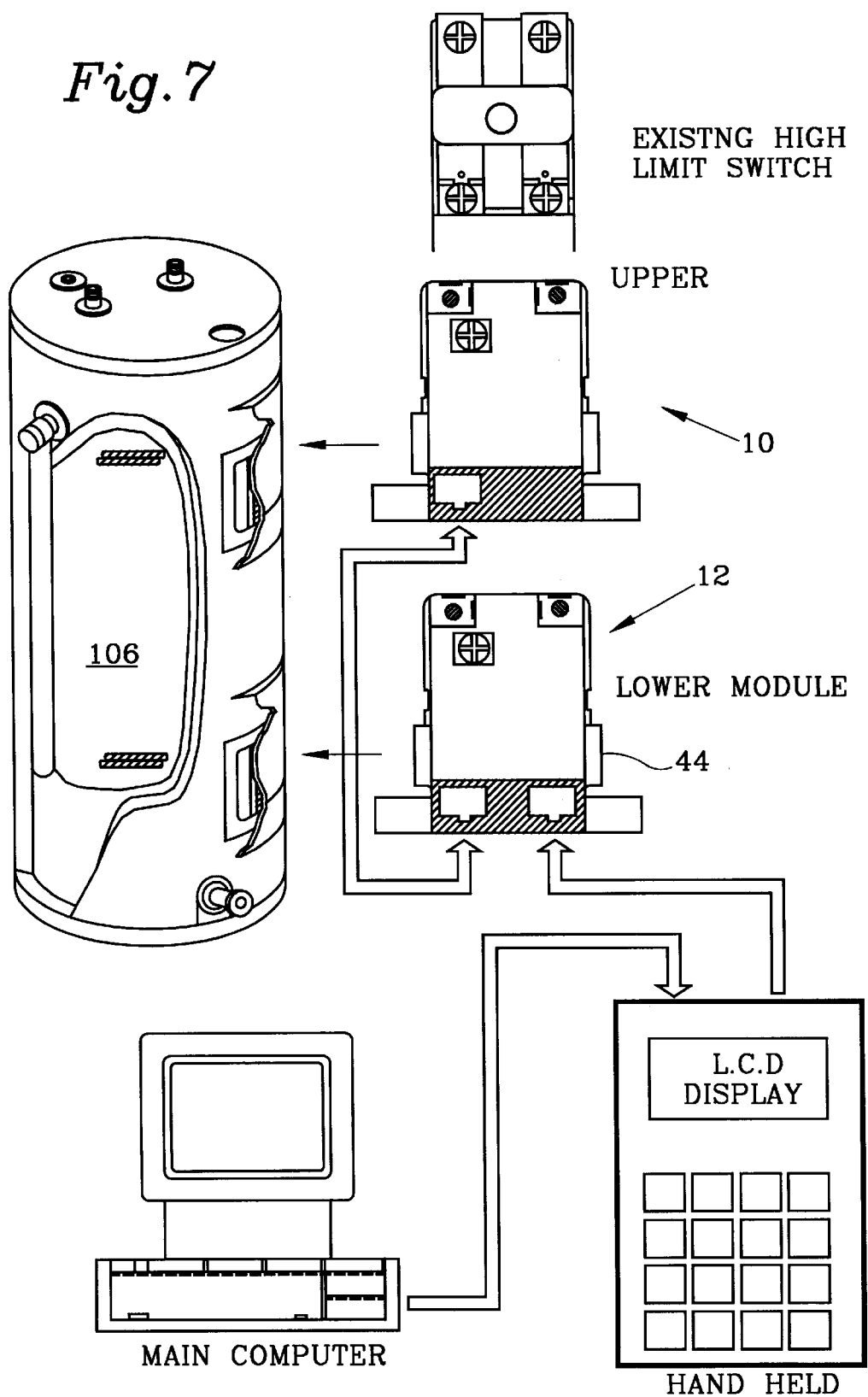
FIG. 7 is a schematic representation showing one implementation of the controller of FIG. 6.
Figure 8:
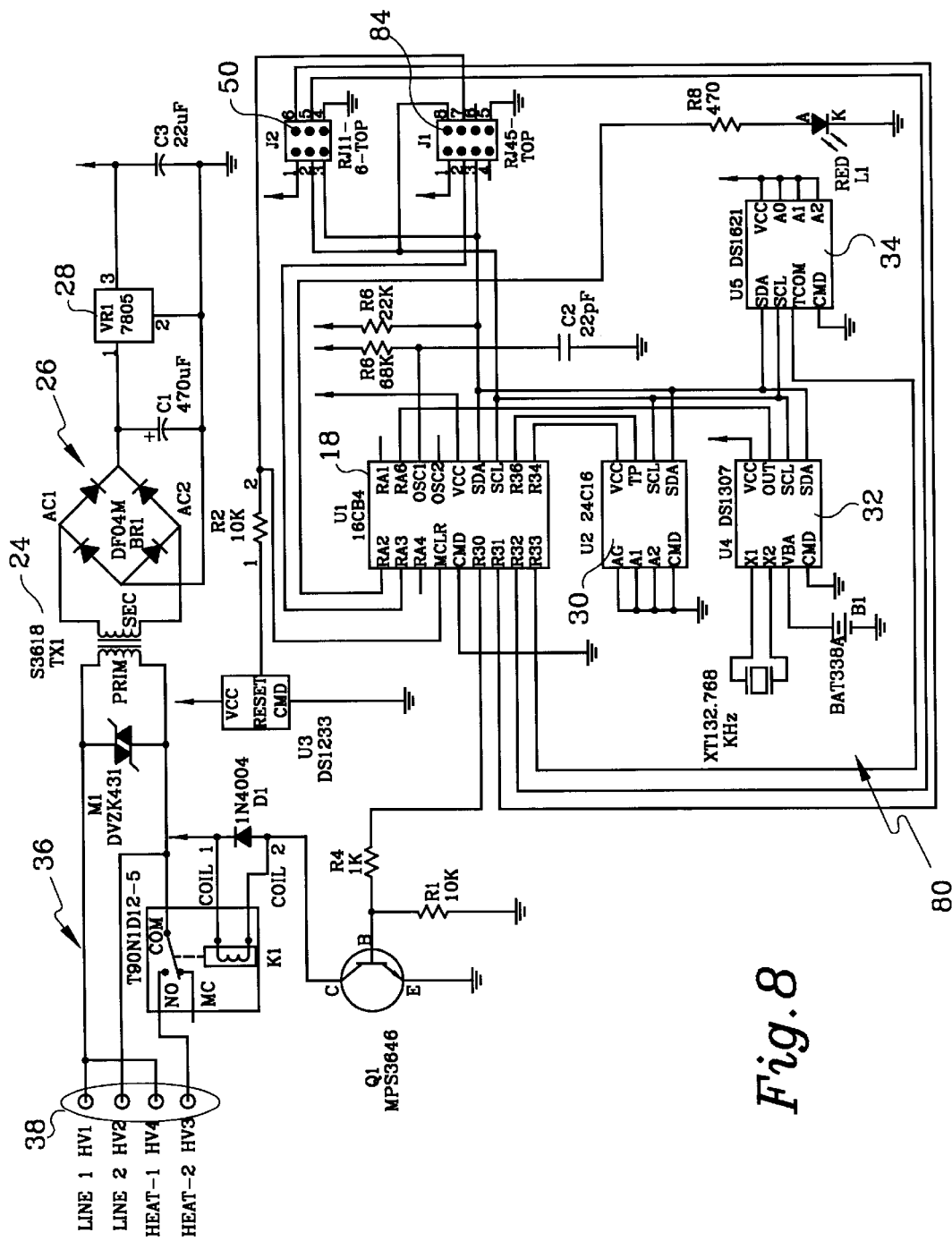
FIG. 8 is a circuit diagram of a lower part of a controller system.
Figure 9:
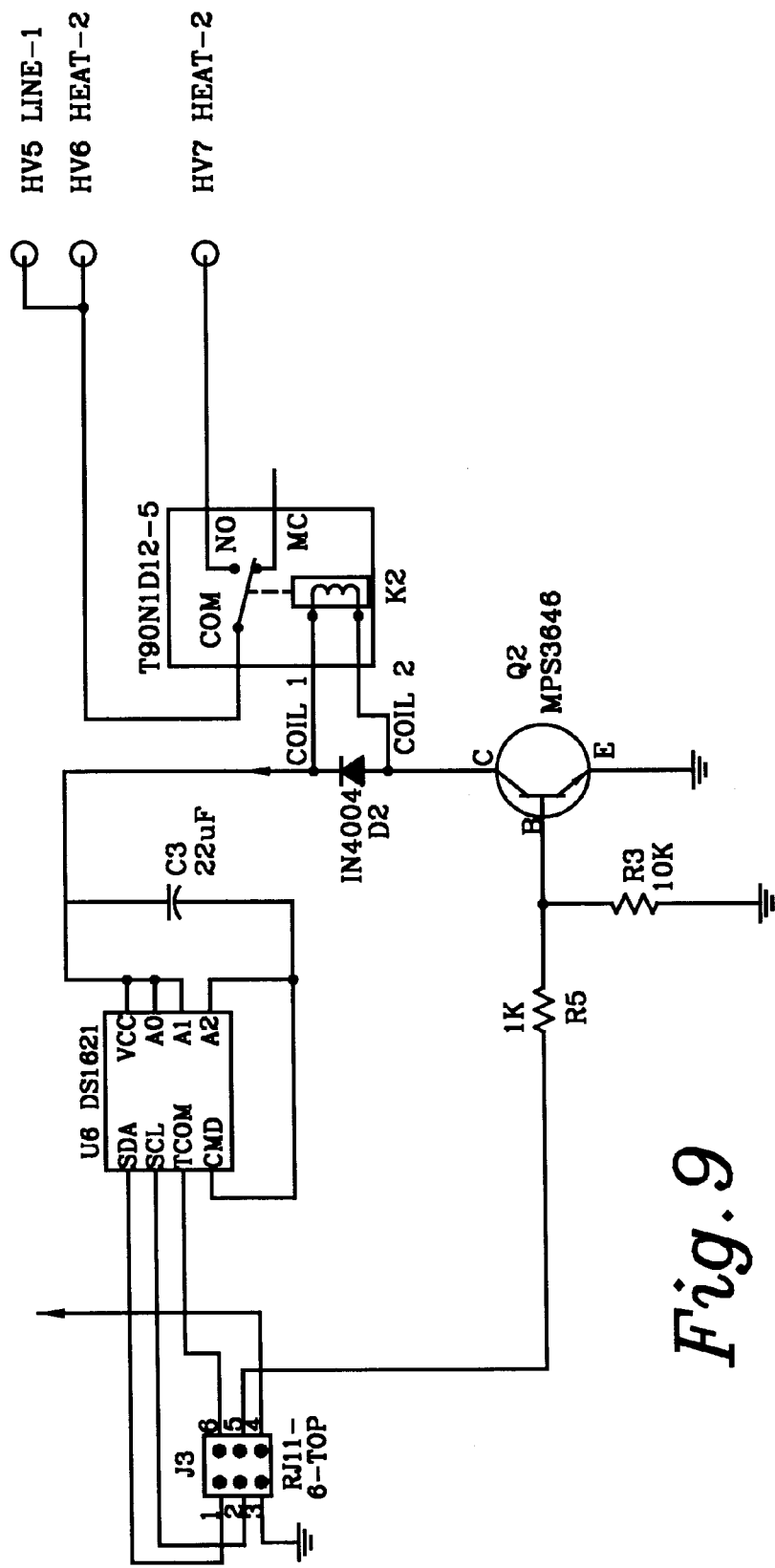
FIG. 9 is a circuit diagram of an upper part of a controller system.
Figure 10E:
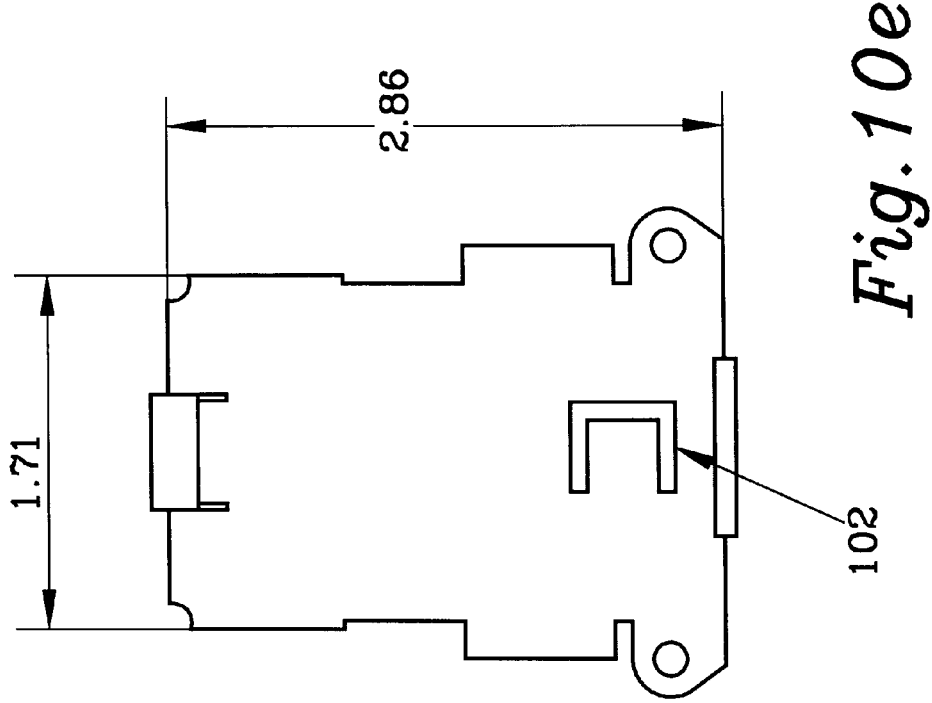
FIG. 10 are collectively several views of the housing for the upper part of a controller system.
Figure 10F:
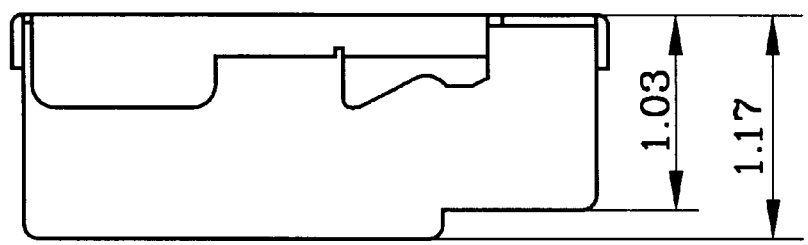
Figure 11E:
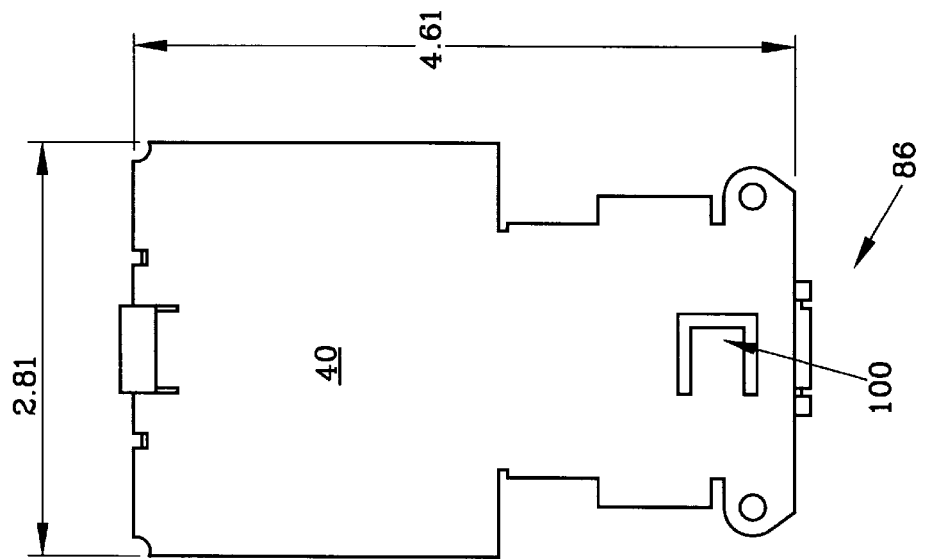
FIG. 11 are collectively several views of the housing for the lower part of the controller system.
Figure 11F:
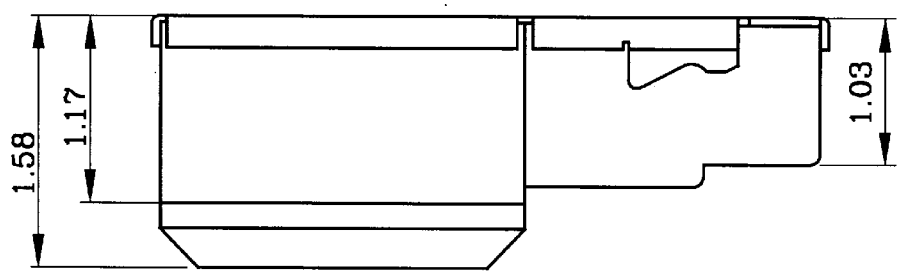

FIG. 6 is a block diagram of a controller system in accordance with this invention. Specifically, the controller system comprises two modules 10 and 12. A first lower control module 12 maintains the temperature of the water in the hot water tank proximate a lower heating element 16 and a second upper control module 10 maintains the temperature of the water in the hot water tank proximate an upper heating element 14. The lower control module 12 comprises a microcontroller is connected to a source of electrical power 20. The electrical power supply 20 comprises a transformer 24, a rectifier 26 and a voltage regulator 28. The transformer converts 240 VAC line voltage to approximate 8 VAC. The 8 VAC are rectified by means of rectifying diodes 26. The output of the rectifying diodes 26 provides approximate 9 VDC to voltage regulator 28. The microcontroller 18 has internal memory storage capability. This storage capability is preferably of the EEPROM type. Additionally, the microcontroller is connected to external memory which is also preferably of the EEPROM type. The internal memory of the microcontroller is used to store operating system type programming instructions for controlling the operation of the microcontroller. The external memory storage is utilized for the storage of data, which may for example, contain the temperature/time set points used by the controller. The microcontroller is further interconnected with a real-time clock 32. The real-time clock provides a digital time signal to the microcontroller. The real time signal is used by the operating system software to adjust the temperature set points in accordance with time/temperature set points. The real time clock is further connected to a lithium battery back-up power supply, used in. case of power failure to ensure timing integrity. The microcontroller is further connected to an electronic thermostat integrated circuit 34 ("IC"). For example, a temperature controlling IC such as the DS1620 or 1621 manufactured by Dallas Semiconductor may be used. This temperature control integrated circuit is provided with appropriate temperature set points by the microcontroller. The temperature control integrated circuit is further connected to a relay circuit 36. The relay circuit is provided with a control signal by the microcontroller 34 which activates and deactivates the relay 36. Moreover, the relay circuit is provided with line voltage at 38. Upon activation of the relay, this line voltage is further fed to a lower heating element 16 in the hot water tank. In operation, the temperature control integrated circuit is provided with a temperature set point by the microcontroller. The temperature control integrated circuit provides the microcontroller with a temperature request signal. In response, the microcontroller actuates the relay which thereby provides electrical energy to the element. At the same time, the temperature control integrated circuit measures ambient temperature by noting the temperature of its outer case. This outer case is thermally connected to the rear plate 40 of the housing 44 for the control system. The rear plate in turn is in thermal contact with an outer portion of the hot water heater near the lower element. Accordingly, the temperature control integrated circuit provides a temperature request signal to the microcontroller until the temperature of the hot water heater near the outer casing reaches the temperature set point as set by the microcontroller. Further connected to the microcontroller is a communications 50. This communications jack 50 is also connected to the power supply.

Located in proximity to the upper heating element in a hot water heating tank is a second control module 10 of the control system. This second module further comprises control electronics including a temperature control IC 60, a relay circuit 62 connected to the temperature control IC 60 and further connected to the upper heating element 14. The temperature control IC 60 is also connected to a communications connector 64. The communications connector 64 is interconnected with the temperature control integrated circuit to provide it with both control signals and power. The communications connector 64 is further adapted to be connected by means of a communications cable to the communications connector 50 of the lower control module. Thus, the microcontroller 18 and power supply 20 of the lower control module 12 provide power and control signals to the temperature control IC 60 of the upper control module 10. The temperature control IC 60 of the upper module is identical to the temperature control IC of the lower module and is thermally interconnected to the rear of the mounting case of the upper module. Thus, the microcontroller 18 provides the temperature control integrated circuits in the upper and lower modules with appropriate temperature set points for the hot water temperature of the tank proximate the upper and lower heating elements. The temperature control IC of the top module directly actuates the relay in the upper control module to energize the heating element near the upper portion of the tank until the set temperature is reached. Of course, the set point for the upper control module is entirely independent of the temperature set point for the lower control module. In operation during various times of the heating cycle, the microcontroller thus obtains set point data from the EEPROM memory and provides the lower and upper temperature control integrated circuits with these set points, as described below.

In order to avoid the provision of power to both the upper and lower elements simultaneously, the temperature control integrated circuits further provides the microcontroller with "temperature request signals" indicating that the upper or lower elements are or should be energized. The microcontroller ensures that only a single heating element is energized at one time by directly controlling the lower relay. If the upper temperature control IC has activated the upper tank heating element, the lower relay will not be activated. Once the upper heating element has reached its set point and energy is no longer provided to this element, the lower element will be actuated so that the temperature of the lower portion of the hot water tank may reach the lower set point temperature.

The lower control module 12 may further be provided with a second communication connector 84. This connector may be adapted to interface with a programming device. This programming device may take the form of a hand held programming unit having external memory storage facilities. Alternatively, this programming device may take the form of a personal computer or may take the form of an interface unit which may be interconnected with a further communication network such as the telephone network. This programming unit may be used to alter the set point data or operating system program of the controller. As this data is stored in EEPROM memory, it may be easily modified as required.

The upper and lower control modules 10, 12 are each contained in separate casings. A first casing 80 contains the lower control module. This casing is comprised of two elements: an outer plastic enclosing shell; and a metallic heat conductive rear plate. The device electronics for the lower module are mounted within the plastic outer shell 88. The rear thermal conducting plate is adapted to engage the plastic outer shell and to make a thermal connection with the casing of the temperature control IC forming part of the device electronics mounted within the outer shell. This connection takes the form of a simple tongue element 100, pressed out of the back plate. The upper plate has a corresponding tongue 102 in the back plate. It is further adapted to be mounted on the exterior of a standard hot water tank 106. The casing is shaped so as to replace and indeed retrofit with existing bimetallic thermostats. When mounted on a hot water tank, the thermal contact conductive plate makes thermal contact with the outer shell of the hot water tank. Thus, the rear mounting plate will be maintained at a temperature which closely approximates the temperature of the water near the mounting location of the lower portion of the controller.

Similarly the upper portion of the controller is housed in a outer plastic shell. This shell is somewhat smaller in size than the shell used to house the lower control module. A thermally conducting rear plate is also used to encapsulate the device electronics of the upper portion of the control unit. This thermally conducting back plate is adapted to engage the plastic shell. The back plate is adapted to be mounted near the bottom of the hot water tank and will be maintained at approximately the same temperature as the water near this mounting point. The back plate is further adapted to make thermal contact with the temperature control IC of the upper portion of the control module. The housing for the upper control module is adapted to interface with existing high limit safety switches, used in conventional hot water heaters. The high limit switch may be electrically connected to the heating element and the control system power supply. In the event that the upper element overheats, the high limit switch will disconnect the electric energy to the control system.

THE ALGORITHM

Programmed within the EEPROM memory forming part of the micro-controller is a control algorithm for varying the upper and lower temperature set-points for the hot water heater.

The algorithm functions as follows:
1. Microcontroller retrieves a start time (t0) and an initial upper and lower tank temperature (u0, l0) set-points from external EEPROM;
2. Microcontroller retrieves a time setting from clock;
3. Microcontroller, compares time setting with t0;
4. If retrieved time setting is greater than or equal to to then u0 and l0 are provided to temperature control ICs;
5. Microcontroller reads "temperature request signals" from upper and lower temperature control ICs; if the upper "temperature request signal" is present, no energy is provided to the lower control relay; if the lower temperature request signal is present and the upper temperature request signal is not present, the lower control relay is actuated.

6. Microcontroller retrieves new start time (tnew) and second upper and lower temperature (unew, lnew) set points from external EEPROM;
7. Microcontroller retrieves a time setting from clock;
8. Microcontroller, compares time setting with tnew;
9. If retrieved time setting is greater than or equal to tnew then unew and lnew are provided to temperature control Ics;
10. Steps 6–9 are repeated until the end of the program cycle is reached (usually at the end of a day);
11. Pointers are set so that t0 and tnew are chosen for the beginning of the next program cycle (ie., the next day);
12. The algorithm is repeated beginning with step 1.

Instead of storing a series of set-points for the entire program cycle, it may be possible to incorporate a mathematical relationship in the algorithm for determining the set points for various time intervals. Thus, for example a linear increase in temperature during off-peak hours may be achieved by storing a series of increasing set-points in the EEPROM memory, or by programminq a linear function into the control algorithm. The linear function, could calculate new set points by taking a previous set point and adding an increment thereto.

It should be noted that because the nature of temperature control ICs, the microcontroller does not need to monitor or otherwise control the bottom and top tank temperatures. The temperature control ICs have embedded within them, their own control algorithm which is used to maintain the temperature of the casing of the IC (which is thermally connected to the heater) at the required set-point temperature. The algorithm within the IC may, for example, employ known P-I-D control loop techniquies. The precision of the controller may however be externally programmed, by for example, the microcontroller.

FIG. 3 details a typical program cycle for a typical day. The set-point cycle has the following characteristics:

1. Beginning at the commencement of peak demand time, the upper element set point temperature is set at approximately 80% of the maximum tank temperature;
2. The set-point temperature for the lower portion of the tank is set at approximately 60% of the maximum tank temperature;
3. Temperatures set in 1. and 2. are maintained for several hours;
4. At the beginning of a maximuim demand period the set-point for the lower element is reduced to 0; the set-point for the upper tank temperature is retained at approximately 80% or the maximum temperature;
5. Temperature settings in 4. are maintained until the end of the maximum demand period (typically for 4 hours);
6. At the beginning of the off-peak period, the upper and lower set points are increased linearly, (typically once per hour) so that both the upper and lower tank temperatures reach the maximum temperature set points at the beginning of the peak period;
7. The program cycle is repeated.

In order to distribute power requirements of several tanks, each controller has an arbitrary off-set time for increasing the set-points of the upper and lower tank temperatures. For example a first tank may provide its new set-point data for upper and lower tank temperature to the temperature control ICs at 5 minutes past each hour. Another controller may provide its new set-point data for upper and lower tank temperatures to the temperature control ICs at 30 minutes past each hour. Since the time required to increase the upper and lower tank temperatures from their previous set points to their new set points is typically only a fraction (often only a tenth i.e. 6 min.) of the interval between changing set point temperatures (for example, 1 hr.), the two tanks of the above example would not be energized at the same time during the off-peak interval. Thus, if this start-time off-set is varied from consumer to consumer, statistically, only a fraction of all hot water heaters on a power grid will be energized at the same time during off peak intervals. This concept of "staggering" the heating times of hot water heaters in a region may also be employed to further reduce the total power demand during peak periods created by hot water heaters on a grid.

It will, of course be understood, that the peak times and maximum peak times may be varied from municipality to municipality; from day to day; season to season etc., as required by the power provider. Because of the flexibility of this invention, the EEPROM may store different program cycles for different days, weeks, seasons, etc. Additionally, as the EEPROM may be re-programmed the programming cycles may be changed, as required. A person skilled in the art will understand that the invention is not limited to the embodiments described and shown herein which are deemed to be merely illustrative of the best modes of carrying out the invention which are susceptible to modification of form, arrangement of parts and details of operation. The invention rather is intended to encompass all such modifications which fall within its spirit and scope as defined by the claims.

I claim:

1. A system for controlling the heating of water in a tank, said water in said tank being heated by a first heater and a second heater, said system comprising:
    a timer adapted to keep time;
    temperature sensor means for monitoring the temperature of water in said tank both at a first position and the temperature of water in said tank at a second position;
    a controller for setting a first set point temperature, for varying said first set point temperature over time, for setting a second set point temperature, and for varying said second set point temperature over time;
    first activation means for activating said first heater to maintain the temperature of water in said tank at said first position at about said first set point temperature at a first specified time; and
    second activation means for activating said second heater to maintain the temperature of water in said tank at said second position at about said second set point temperature at a second specified time.

2. A system as claimed in claim 1, wherein the controller comprises means for increasing said first set point temperature from a first start temperature to a first finish temperature.

3. A system as claimed in claim 2 wherein said controller comprises means for detecting when an off peak time period is occurring according to said timer, and wherein said increasing means operates during said off peak time.

4. A system as claimed in claim 2 wherein said controller further comprises means for increasing said second set point temperature from a second start temperature to a second finish temperature.

5. A system as claimed in claim 1 wherein said first position is proximate said first heater and said second position is proximate said second heater.

6. A system for controlling the heating of water in a tank, said tank having a first and second heater for heating said water, comprising:

a first module for activating said first heater to maintain water in said tank proximate said first heater at a first selectable temperature, said first selectable temperature being variable over time;

a second module for activating said second heater to maintain water in said tank proximate said second heater at a second selectable temperature, said second selectable temperature being variable over time; and said first module comprising a processor for the exchange of data between said first and second modules said data used in controlling activation of said second heater;

communication means between said first and second modules for permitting said exchange of data between said first and second modules;

wherein said first and second selectable temperatures are substantially independent.

7. The system of claim 6 wherein said data is used in controlling activation of said first heater.

8. The system of claim 7 wherein said first module comprises a first temperature control means responsive to said data provided by said processor for activating said first heater to maintain water in said tank proximate said first heater at said first selectable temperature;

and said second module comprises:

temperature control means responsive to said data provided by said processor for activating said second heater to maintain water in said tank proximate said second heater at said second selectable temperature; and wherein said communication means provides said data from said processor to said second module.

9. The system of claim 8 wherein said data comprises a first and second set-point temperature;

said first temperature control means comprises a programmable electronic thermostat for maintaining a first measured temperature at said first set-point;

and said second temperature control means comprises a second programmable electronic thermostat for maintaining a second measured temperature at said second set-point.

10. The system of claim 9 wherein said first module comprises a casing comprising a thermal conductive portion wherein said thermal conductive portion is in contact with said tank and said first temperature sensor to provide said first temperature sensor with said first measured temperature.

11. The system of claim 10 wherein said second module comprises a casing comprising a thermal conductive portion wherein said thermal conductive portion is in contact with said tank and said temperature sensor to provide said second temperature sensor with said second measured temperature.

12. The system of claim 11 wherein said tank has a top and bottom, and wherein said first heater is located proximate said bottom of said tank and said second heater is located proximate said top of said tank.

13. The system of claim 6 wherein said communication means comprises a communications cable.

14. The system of claim 6 further comprising a communications jack on said upper and lower modules for connecting said communications cable.

15. The system of claim 14 further comprising a communications jack on said first module for connecting said first module to an external programming device for programming said processor.

16. A method for controlling the temperature of water in a hot water tank comprising the steps of a) selecting a first first location set-point temperature and maintaining the temperature of water proximate a first location of said tank at about said first first location set-point temperature during a first time interval;

b) selecting a first second location set-point temperature and maintaining the temperature of water proximate a second location of said tank at about said first second location set-point temperature during said first time interval;

c) selecting a subsequent first location set-point temperature and maintaining the temperature of water proximate said first location of said tank at about said subsequent first location set-point temperature during a subsequent time interval;

d) selecting a subsequent second location set-point temperature and maintaining the temperature of water proximate said second location of said tank at about said subsequent second location set-point temperature during said subsequent time interval.

17. The method of claim 16 further comprising e) repeating steps c) and d) until the expiration of a timing cycle.

18. The method of claim 17 further comprising repeating steps a) to e) in a subsequent timing cycle.

19. The method of claim 18 wherein said tank comprises a top and bottom and wherein said first location is proximate said bottom of said tank and said second location is proximate said top of said tank.

20. The method of claim 19 wherein said second location set-point temperature is reduced from a maximum second location set-point temperature during a peak hydro power demand interval during said timing cycle.

21. The method of claim 20 wherein said first location set-point temperature is less than said second location set-point temperature during said peak hydro power demand interval.

22. The method of claim 21 wherein said first location set-point temperature is reduced to prevent heating of said water at said first location for a portion of said peak hydro power demand interval.

23. The method of claim 22 wherein said first and second location set-points are increased linearly during said peak hydro demand interval, so that said water temperature at said first and second locations reaches a maximum temperature at an end of said peak hydro demand interval.

* * * * *